United States Patent
Lin

(10) Patent No.: US 12,323,413 B2
(45) Date of Patent: Jun. 3, 2025

(54) METHOD FOR LOGGING IN ONLINE SYSTEM WITHOUT USERNAME AND PASSWORD, AND AUTHENTICATION SERVER

(71) Applicant: LYDSEC DIGITAL TECHNOLOGY CO., LTD., Taipei (TW)

(72) Inventor: Maw-Tsong Lin, Taipei (TW)

(73) Assignee: LYDSEC DIGITAL TECHNOLOGY CO., LTD., Taipei (TW)

( * ) Notice: Subject to any disclaimer, the term of this patent is extended or adjusted under 35 U.S.C. 154(b) by 257 days.

(21) Appl. No.: 18/316,302

(22) Filed: May 12, 2023

(65) Prior Publication Data

US 2023/0388295 A1    Nov. 30, 2023

Related U.S. Application Data

(60) Provisional application No. 63/345,720, filed on May 25, 2022.

(30) Foreign Application Priority Data

Jan. 19, 2023  (TW) ................................ 112102714

(51) Int. Cl.
*H04L 9/40* (2022.01)
(52) U.S. Cl.
CPC ........ *H04L 63/083* (2013.01); *H04L 63/0876* (2013.01)
(58) Field of Classification Search
CPC .......................... H04L 63/083; H04L 63/0876

USPC ........................................................... 726/7
See application file for complete search history.

(56) References Cited

U.S. PATENT DOCUMENTS

| | | | |
|---|---|---|---|
| 2011/0185181 A1* | 7/2011 | Lin ...................... | H04L 63/123 380/279 |
| 2012/0167189 A1* | 6/2012 | Aichroth ............... | H04L 9/3218 726/7 |
| 2014/0282961 A1* | 9/2014 | Dorfman ............ | G06Q 20/3276 726/7 |

(Continued)

FOREIGN PATENT DOCUMENTS

WO    WO-2020092832 A1 *   5/2020   ............ G06F 21/32

*Primary Examiner* — Hee Soo Kim
(74) *Attorney, Agent, or Firm* — Birch, Stewart, Kolasch & Birch, LLP

(57) ABSTRACT

A method for logging in an online system through an authentication server is provided. The authentication server records an authentication account of the authentication server, and an alias, a login username of the online system, and an authentication device that are associated with the authentication account. The method includes steps of: the online system sending a user-input name to the authentication server; the authentication server finding the authentication account; the authentication server, when determining that the user-input name conforms with the alias, sending a query message to the authentication device that is associated with the authentication account thus found; the authentication server, when receiving a confirmation message from the authentication device, providing the login username to the online system; and the online system, when determining that the login username has been registered on the online system, allowing an Internet device to log in to the online system.

21 Claims, 7 Drawing Sheets

(56) References Cited

U.S. PATENT DOCUMENTS

| | | | |
|---|---|---|---|
| 2015/0249540 A1* | 9/2015 | Khalil | H04L 63/18 |
| | | | 713/158 |
| 2015/0365400 A1* | 12/2015 | Cox | H04L 63/08 |
| | | | 726/7 |
| 2017/0012992 A1* | 1/2017 | Doctor | H04L 63/08 |

* cited by examiner

METHOD FOR LOGGING IN ONLINE SYSTEM WITHOUT USERNAME AND PASSWORD, AND AUTHENTICATION SERVER

CROSS-REFERENCE TO RELATED APPLICATIONS

This application claims the benefit of U.S. Provisional Patent Application No. 63/345,720, filed on May 25, 2022, which is incorporated by reference herein in its entirety, and claims priority to Taiwanese Invention Patent Application No. 112102714, filed on Jan. 19, 2023.

FIELD

The disclosure relates to a method for logging in an online system, and more particularly to a method for logging in an online system without a username and a password, and an authentication server implementing the same.

BACKGROUND

Conventionally, a user needs to first register an account on the online system, before the user can log in to the online system using the account, which normally includes a combination of a username and a password, where the username usually needs to be unique in a database of the online system. It is common for the user to use easily remembered personal information such as first and last name, email address, identification number (or social security number), or mobile phone number as the username. The password is usually required to be of a certain length and contain a mix of letters, numbers, or symbols.

It is common for the user to use the same username (e.g. private email address) and password for multiple accounts across various online systems for convenience. Unfortunately, if a hacker manages to obtain the username and password of one of the accounts, the hacker may easily gain access to the user's all other accounts on different online systems.

To lower the risks of being hacked, the user may choose to use different username-password combinations for different online systems. However, this may lead to the user forgetting the usernames or the passwords for less frequently used online systems, and the user may have to reset the password through a password reset process. The password reset process usually involves the online system sending a security code via SMS or email to the user, and a hacker may use the password reset process as a "back-door" to change the password, and/or account contact information, etc., and take over the account, and thus the password reset process exposes the username and the password to additional hacking risks. Another drawback of using username and password to log in is that the username usually includes private information of the user such as identification number (or social security number), mobile number or email address that is unique to the user, and it would be difficult to protect the private information of the user since the user themselves may distribute their private information over the Internet by typing in the username.

SUMMARY

Therefore, an object of the disclosure is to provide a method for logging in an online system through an authentication server, and an authentication system that can alleviate at least one of the drawbacks of the prior art.

According to one aspect of the disclosure, a method for logging in an online system through an authentication server is provided. The authentication server stores authentication account data related to an authentication account that is registered on the authentication server, an alias associated with the authentication account, a login username of a login account, and information of an authentication device that is bound to the authentication account, wherein the login account is registered on the online system and is associated with the authentication account. The authentication server is coupled to the online system. The method includes steps of: the online system sending a user-input name to the authentication server, where the user-input name was inputted on a login page of the online system opened on an Internet device; the authentication server finding the authentication account; the authentication server determining whether the user-input name received from the online system conforms with the alias that is stored in the authentication server; when the authentication server determines that the user-input name conforms with the alias, the authentication server sending a query message to the authentication device that is bound to the authentication account thus found, where the query message is related to asking whether to log in to the online system; when the authentication server receives a confirmation message from the authentication device in response to the query message, the authentication server providing the login username of the login account that is associated with the authentication account to the online system; the online system determining whether the login username provided by the authentication server has been registered on the online system; and when the online system determines that the login username has been registered on the online system, the online system allowing the Internet device to log in to the online system with the login account.

According to another aspect of the disclosure, an authentication system including an authentication device and an authentication server is provided. The authentication system is configured to allow an Internet device to log in to an online system without a username and a password. The authentication device is configured to communicate with the authentication server. The authentication server is coupled to the online system, and is configured to communicate with the online system. The authentication server stores an authentication account data related to an authentication account that is registered on the authentication server, an alias that is associated with the authentication account, a login username of a login account, and information of the authentication device that is bound to the authentication account, wherein the login account is registered on the online system and is associated with the authentication account. The online system is configured to send a user-input name to the authentication server, where the user-input name was inputted on a login page of the online system opened on the Internet device. The authentication server is configured to find the authentication account, and when the authentication server determines that the user-input name received from the online system conforms with the alias, send a query message to the authentication device that is bound to the authentication account thus found, where the query message is related to asking whether to log in to the online system. The authentication server is configured to, when the authentication server receives a confirmation message from the authentication device in response to the query message, provide the login username of the login account that is associated with the authentication account to the online system. The online system is configured to, when determining that the login username has been registered on the online system, allow the Internet device to log in to the online system with the login account.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
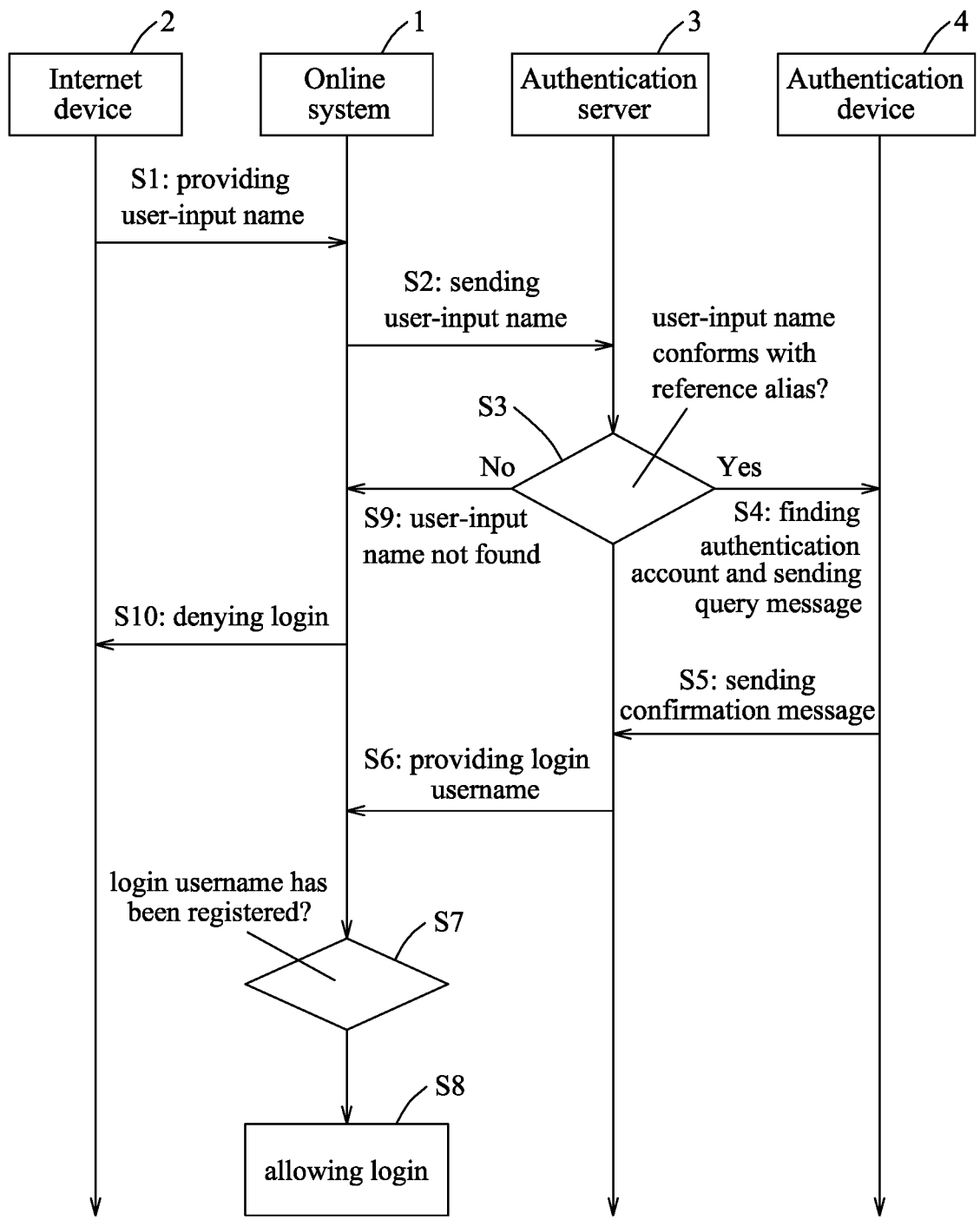
FIG. 1 is a flow chart illustrating a method for logging in to an online system according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
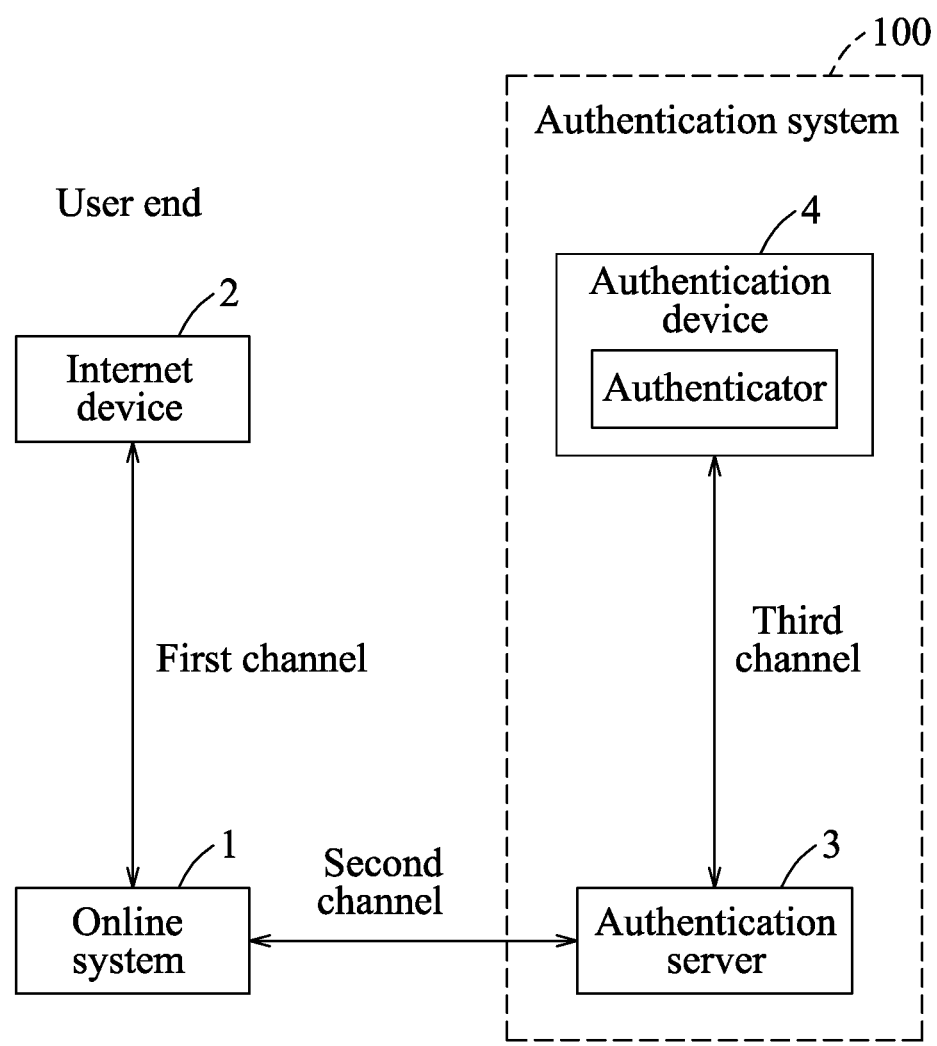
FIG. 2 is a block diagram illustrating an authentication system according to an embodiment of the disclosure.

Referring to FIGS. 1 and 2, a method for logging in to an online system 1 according to an embodiment of the disclosure is implemented by an authentication system 100. The authentication system 100 is configured to allow a user to use an Internet device 2 to log in to the online system 1 without inputting a username and a password. The authentication system 100 includes an authentication server 3 that is located remotely (on the Internet) and an authentication device 4 that is to be held and used by the user.

The online system 1 may be any website or server that provides an online service, such as online banking system, health insurance system, company website, school website, public transportation booking website, shopping website (e.g., Amazon, eBay, PChome, MoMo), streaming platforms (e.g., Spotify, Netflix, YouTube), social media (e.g., Facebook, Twitter, Line), etc.

The Internet device 2 may be any device that allows the user to log in to the online system 1, such as a personal computer, a laptop, a smart mobile phone, a tablet, a car terminal computer, a smart home appliance terminal computer, etc. The authentication server 3 is coupled to the online system 1, and may be a remote computer device or a computer system that can be located on the Internet.

The authentication device 4 may be any device that allows the user to confirm an action of logging in to the online system 1, such as a personal computer, a laptop, a smart mobile phone, a tablet, a car terminal computer, a smart home appliance terminal computer, etc.

The authentication device 4 is installed with an authenticator (i.e., a specialized application program) and may be connected to the authentication server 3 by running the authenticator. When the authentication device 4 connects to the authentication server 3, the authentication server 3 performs a verification process to verify the authentication device 4 using the authenticator, and after confirming that the authentication device 4 has passed the verification process, the authentication device 4 may be allowed to communicate with the authentication server 3 through the authenticator. Reference may be made to Taiwanese Patent No. I413393 and U.S. Patent Application Publication No. US2011185181A1 for further details of such authenticator.

Before implementing the method for logging in to the online system 1 as shown in FIG. 1, the authentication device 4 is bound to an authentication account (e.g., having an authentication username of "username A") that is registered on the authentication server 3 by the user, and the authentication server 3 stores authentication account data related to the authentication account, at least one alias (e.g., "a1", "a2", "a3") associated with the authentication account, a login username (e.g., "username B") of a login account, and information of the authentication device 4, wherein the login account is registered on the online system 1 and is associated with the authentication account. The authentication server 3 also stores user data related to the authentication account, and the user data may include, but not limited to, a first name and a last name of the user, an email address, a mobile phone number, etc., where the email address and the mobile phone number are contact information used by the authentication server 3 to communicate with the authentication device 4. The information of the authentication device 4 that is bound to the authentication account may be obtained by, for example, the authentication device 4 logging in to the authentication server 3 using the authentication account, the authentication server 3 communicating with the authentication device 4 via the email address or the mobile phone number of the authentication account, and after confirming that the authentication device 4 has passed the verification process, the authentication server 3 determining that the authentication device 4 is bound to the authentication account.

When the user intends to log in to the online system 1, the user may run the authenticator on the authentication device 4 to communicate with the authentication server 3, and the authentication server 3 performs the abovementioned verification process to verify the authentication device 4.

When the user accesses the online system 1 using the Internet device 2, the online system 1 may provide a login page (not shown) for the user to input login information, and the user may choose to input one of the at least one alias that is stored on the authentication server 3 as a first user-input name. The flow of the method for logging in to the online system 1 as shown in FIG. 1 includes steps S1-S10. Assuming that the user inputted the alias "a1" as the first user-input name on the login page.

In step S1, the Internet device 2 sends the first user-input name (a1) to the online system 1, and in step S2, the online system 1 sends the first user-input name (a1) thus received to the authentication server 3.

In step S3, the authentication server 3 determines whether the first user-input name (a1) received from the online system 1 conforms with one of a plurality of reference aliases that are stored in the authentication server 3. It should be noted that the reference aliases include the at least one alias of the authentication account, and may further include another alias of another account registered on the authentication server 3.

When the authentication server 3 determines that the first user-input name (a1) conforms with one of the reference aliases, the authentication server 3 finds the authentication account that is associated with the one of the reference aliases, and the flow proceeds to step S4; otherwise, the flow proceeds to step S9.

In step S4, the authentication server 3 finds the authentication device 4 that is bound to the authentication account based on the user data (i.e., contacting the authentication device 4 using the email address or the mobile phone number from the user data), and sends a query message to the authentication device 4 thus found, where the query message is related to asking whether to log in to the online system 1.

If the user intends to log in to the online system 1 using the Internet device 2, the user may operate the authentication device 4 to confirm the query message received by the authentication device 4, and then, in step S5, the authentication device 4 sends a confirmation message to the authentication server 3 in response to the user operation. In some embodiments, after the authentication server 3 sends the query message to the authentication device 4, if the authentication server 3 receives a denial message or has not received the confirmation message within a predetermined time period (e.g., 10 seconds), the authentication server 3 notifies the online system 1 to deny login of the Internet device 2.

In step S6, after the authentication server 3 receives the confirmation message, the authentication server 3 provides the login username (username B) of the login account that is associated with the authentication account to the online system 1.

In step S7, the online system 1 determines whether the login username (username B) provided by the authentication server 3 has been registered on the online system 1. If affirmative, the flow proceeds to step S8; otherwise, the flow proceeds to step S10.

In step S8, the online system 1 allows the Internet device 2 to log in to the online system 1 with the login account.

When the authentication server 3 determines that the first user-input name received from the online system 1 does not conform with any of the reference aliases that are stored in the authentication server 3, in step S9, the authentication server 3 notifies the online system 1 that the first user-input name is not found.

Then, in step S10, the online system 1 denies login of the Internet device 2.

As such, the user may successfully log in to the online system 1 by inputting one of the at least one alias on the login page, without the need to memorize a specific username and a specific password of the login account registered on the online system 1. It should be noted that data transmitted between the online system 1 and the authentication server 3, and between the authentication device 4 and the authentication server 3 is encrypted. It should be further noted that, in the case where the authentication server 3 is coupled to a plurality of online systems, the online system 1, which the user intends to log in to, sends the first user-input name together with identification information that indicates which online system the online system 1 is to the authentication server 3 so that the authentication server 3 is able to identify the online system 1 among the plurality of online systems, and sends the login username of the login account registered on the online system 1 in step S6.

As shown in FIG. 2, the Internet device 2 sends data (e.g., the first user-input name) to the online system 1 through a first channel, the online system 1 encrypts the data and sends the encrypted data to the authentication server 3 through a second channel, and the authentication server 3 encrypts the query message and sends the encrypted query message to the authentication device 4 through a third channel. Specifically, the first channel, the second channel, and the third channel are independent of and separated from each other. As such, even if a hacker obtains the first user-input name (i.e., one of the at least one alias) from the first channel and provides the first user-input name to the online system 1, the hacker would still be unable to gain access to the online system 1 unless the hacker knows that the online system 1 transmits the first user-input name to the authentication server 3 through the second channel, and that the authentication server 3 sends the query message to the authentication device 4 for asking whether to log in to the online system 1 through the third channel. Accordingly, even if the hacker obtains the at least one alias, it would be difficult for the hacker to also obtain the query message from the third channel. In addition, even if the hacker obtains the query message, the hacker would need to first decrypt the encrypted query message. Furthermore, without access to the authentication device 4 of the user, the hacker would not be able to send the confirmation message using the authentication device 4, and thus would still be denied access (logging in) to the online system 1.

In some embodiments, the Internet device 2 and the authentication device 4 are integrated as one device.

In this embodiment, the at least one alias associated with the authentication account must not be identical to any alias that is used by another account registered on the authentication server 3.

In some embodiments, the at least one alias associated with the authentication account may be allowed to be identical to another alias that is used by another account registered on the authentication server 3. To correctly find the authentication account, additional steps are performed before step S3 to find the authentication account based on the authentication device 4 (instead of finding the authentication account based on the at least one alias as shown in FIG. 1).

Figure 3:
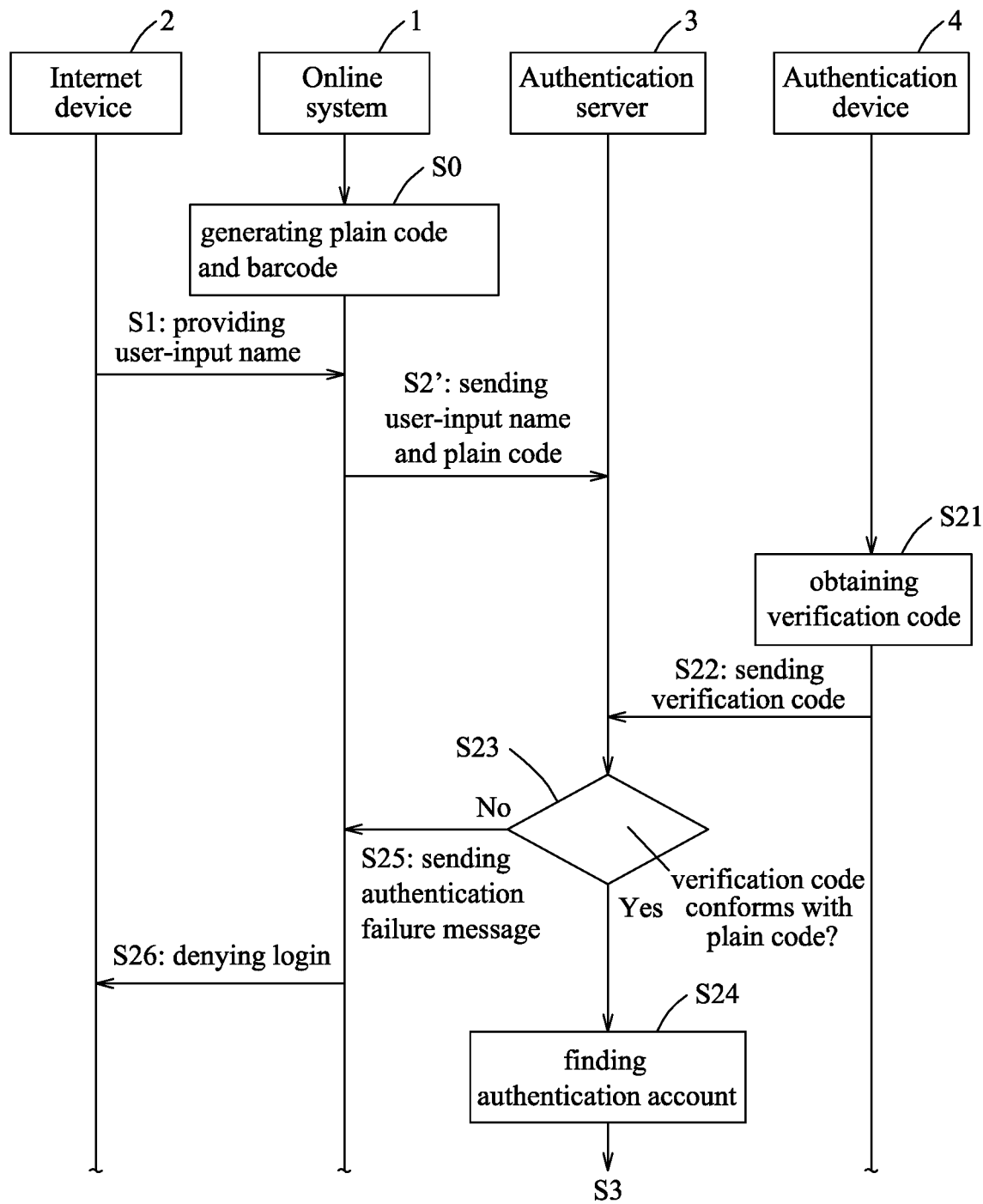
FIG. 3 is a flow chart illustrating steps for finding an authentication account that is bound to an authentication device according to an embodiment of the disclosure.

Further referring to FIG. 3, a first procedure for correctly finding the authentication account includes steps S0, S1 and S2' and steps S21-S26.

In step S0, the online system 1 generates a first plain code (e.g., "123") and a first barcode (e.g., a quick response (QR) code) that contains the first plain code when the Internet device 2 accesses the login page of online system 1.

In step S1, the Internet device 2 sends the first user-input name to the online system 1, and in step S2', the online system 1 sends the first plain code together with the first user-input name to the authentication server 3.

The first plain code and the first barcode are both being displayed on the login page of the online system 1, and the user may choose to scan the first barcode using the authentication device 4 or manually input the first plain code to the authentication device 4.

In step S21, the authentication device 4 obtains a verification code by scanning the first barcode or reading a manual input of the first plain code. The manual input is inputted by the user operating the authentication device 4 with reference to the first plain code displayed on the login page.

In step S22, the authentication device 4 sends the verification code to the authentication server 3.

In step S23, the authentication server 3 determines whether the verification code received from the authentication device 4 conforms with the first plain code received from the online system 1. If the determination is affirmative, the flow proceeds to step S24; otherwise, the flow proceeds to step S25.

In step S24, the authentication server 3 finds the authentication account that is bound to the authentication device 4, from which the verification code is received in step S22. As such, when the at least one alias that is associated with the authentication account is identical to another alias that is used by another account registered on the authentication server 3, the authentication server 3 is able to find the authentication account based on the authentication device 4, thus finding the at least one alias that is associated with the authentication account. After step S24, the flow then proceeds to step S3 of the method shown in FIG. 1.

In circumstances where the alias is allowed to be identical to another alias, in step S3, the authentication server 3 determines whether the first user-input name received from the online system 1 conforms with the at least one alias that is associated with the authentication account thus found in step S24. The flow then proceeds to step S4 where the authentication server 3 sends the query message to the authentication device 4.

When the authentication server 3 determines that the verification code does not conform with the first plain code in step S23, in step S25, the authentication server 3 sends an authentication failure message to the online system 1, and in step S26, the online system 1 denies login of the Internet device 2 in response to receipt of the authentication failure message.

Using the abovementioned flow of method, when the alias is allowed to be identical to another alias, the authentication server 3 is able to, based on the authentication device 4 that sent the first plain code to the authentication server 3, find the authentication account that is bound to the authentication device 4, and then send the login username that is associated with the authentication account thus found to the online system 1, thus allowing the user to successfully log in to the online system 1 using the Internet device 2.

Figure 4:
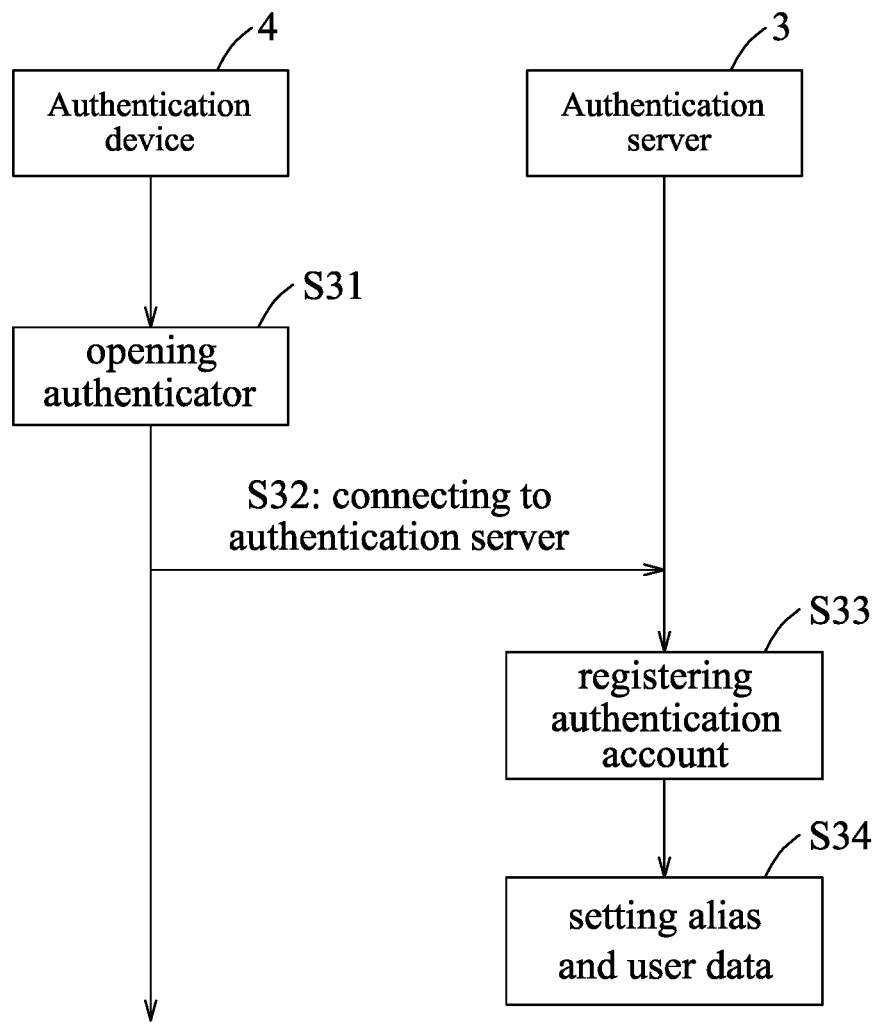
FIG. 4 is a flow chart illustrating steps for registering an authentication account on an authentication server according to an embodiment of the disclosure.

Referring to FIG. 4, before implementing the method for logging in to the online system 1, the authentication account is registered on the authentication server 3 by a first registration procedure which includes steps S31-S34. The first registration procedure is to be performed using the authenticator on the authentication device 4.

In step S31, the user opens the authenticator on the authentication device 4, and in step S32, the authentication device 4 connects to the authentication server 3 through the authenticator.

In step S33, the authentication device 4 allows the user to register the authentication account on the authentication server 3 and set the authentication username (username A) using the authenticator.

In step S34, the authentication device 4 further allows the user to set the at least one alias (a1, a2, a3) and the user data that are associated with the authentication account, where the user data includes the contact information to be used for communicating with the authentication device 4.

Figure 5:
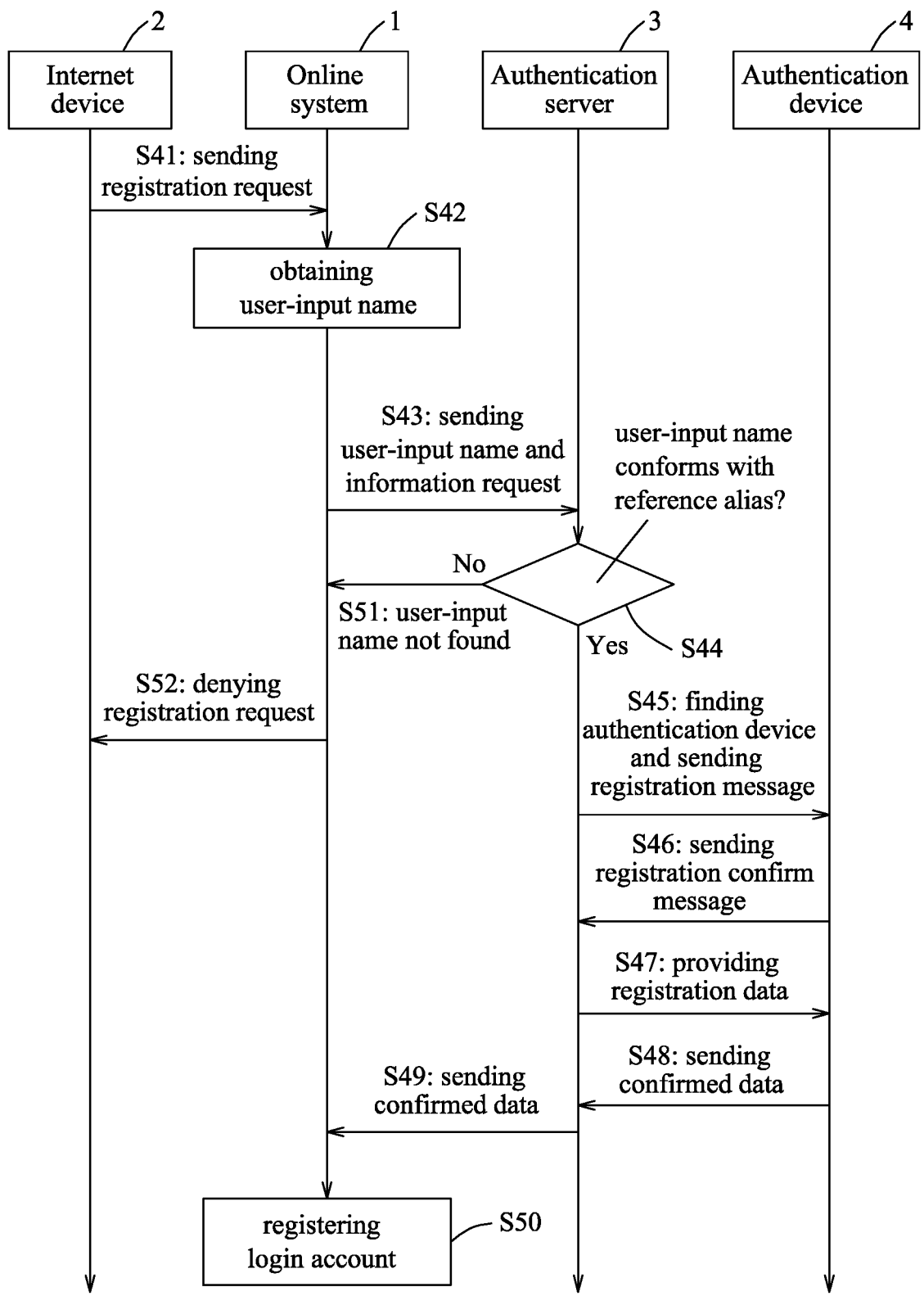
FIG. 5 is a flow chart illustrating steps for registering a login account on an online system according to an embodiment of the disclosure.

Referring to FIG. 5, if the user has not yet registered the login account on the online system 1, the login account that is associated with the authentication account may be registered on the online system 1 by a second registration procedure which includes steps S41-S52.

First, the user accesses the online system 1 using the Internet device 2, and selects a registration option on the login page, the user may then input one of the at least one alias that is stored on the authentication server 3 as a second user-input name on a registration page of the online system 1.

In step S41, the Internet device 2 sends a registration request that includes the second user-input name to the online system 1, and then, in step S42, the online system 1 obtains the second user-input name that is included in the registration request.

In step S43, the online system 1 sends the second user-input name and an information request to the authentication server 3, where the information request is related to asking for user information required for registering the login account on the online system 1.

In step S44, the authentication server 3 determines whether the second user-input name received from the online system 1 conforms with one of the reference aliases that are stored in the authentication server 3.

When the authentication server 3 determines that the second user-input name conforms with one of the reference aliases, the authentication server 3 finds the authentication account that is associated with the one of the reference aliases, and the flow proceeds to step S45; otherwise, the flow proceeds to step S51.

In step S45, the authentication server 3 finds the authentication device 4 that is bound to the authentication account based on the user data, and sends a registration message to the authenticator on the authentication device 4, where the registration message is related to asking whether to register an account on the online system 1.

In step S46, the authenticator sends a registration confirmation message to the authentication server 3 when the user confirms the registration message.

In step S47, the authentication server 3 provides registration data to the authenticator, and the authenticator displays the registration data on the authentication device 4 for the user to confirm (with or without modification). The registration data includes the login username (e.g., which is set to be identical to the authentication username by default, and may be changed to a desired username by the user), and the user information (e.g., address, email address, credit card information, etc.) that the information request asks for and that is obtained from the user data which is associated with the authentication account.

In step S48, confirmed data is generated when the user confirms the registration data that is displayed on the authentication device 4, and then the authenticator sends the confirmed data to the authentication server 3. The confirmed data is the registration data that has been confirmed and/or modified by the user using the authentication device 4.

In step S49, the authentication server 3 sends the confirmed data that is received from the authentication device 4 to the online system 1, and in step S50, the online system 1 registers an account (i.e., the login account) with the login username on the online system 1 according to the confirmed data.

When the authentication server 3 determines that the second user-input name does not conform with any of the reference aliases in step S44, the authentication server 3, in step S51, notifies the online system 1 that the second user-input name is not found, and in step S52, the online system 1 denies the registration request of the Internet device 2 in response to the notification from the authentication server 3.

In some embodiments, the at least one alias associated with the authentication account may be allowed to be identical to another alias that is used by another account registered on the authentication server 3. To correctly find the authentication account, additional steps are performed before step S43 to find the authentication account based on the authentication device 4 (instead of finding the authentication account based on the at least one alias as shown in FIG. 5).

In circumstances where the alias is allowed to be identical to another alias, a second procedure for correctly finding the authentication account is performed before step S43.

Before step S41, the online system 1 generates a second plain code and a second barcode that contains the second plain code when the Internet device 2 accesses the login page of online system 1. Then, between steps S42 and S43, the online system 1 sends the second plain code together with the second user-input name to the authentication server 3.

Further, before step S43, steps S21-S25 of the first procedure for correctly finding the authentication account shown in FIG. 3 are performed by the authentication device 4 and the authentication server 3 as mentioned above, with the first plain code and the first barcode in steps S21-S25 being replaced with the second plain code and the second barcode in the second procedure. After step S25, the flow proceeds to step S52.

In step S43, the online system 1 sends the information request to the authentication server 3. Then, in step S44, the authentication server 3 determines whether the second user-input name received from the online system 1 conforms with one of the at least one alias that is associated with the authentication account found in step S24. When the authentication server 3 determines that the second user-input name conforms with one of the at least one alias that is associated with the authentication account, the flow proceeds to step S45; otherwise, the flow proceeds to step S51.

As such, the authentication server 3 may register the login account on the online system 1, and record the login username of the login account as being associated with the authentication account. It should be noted that the authentication server 3 may register the login account using the authentication username of the authentication account on the online system 1 (i.e., the authentication username may be identical to the login username of the login account).

When the user has already registered the authentication account on the authentication server 3 and intends to register a new account on another online system, the user may perform the second registration procedure, and then the user may log in to the another online system through the Internet device 2 using the flow of method as shown in FIG. 1.

Figure 6:
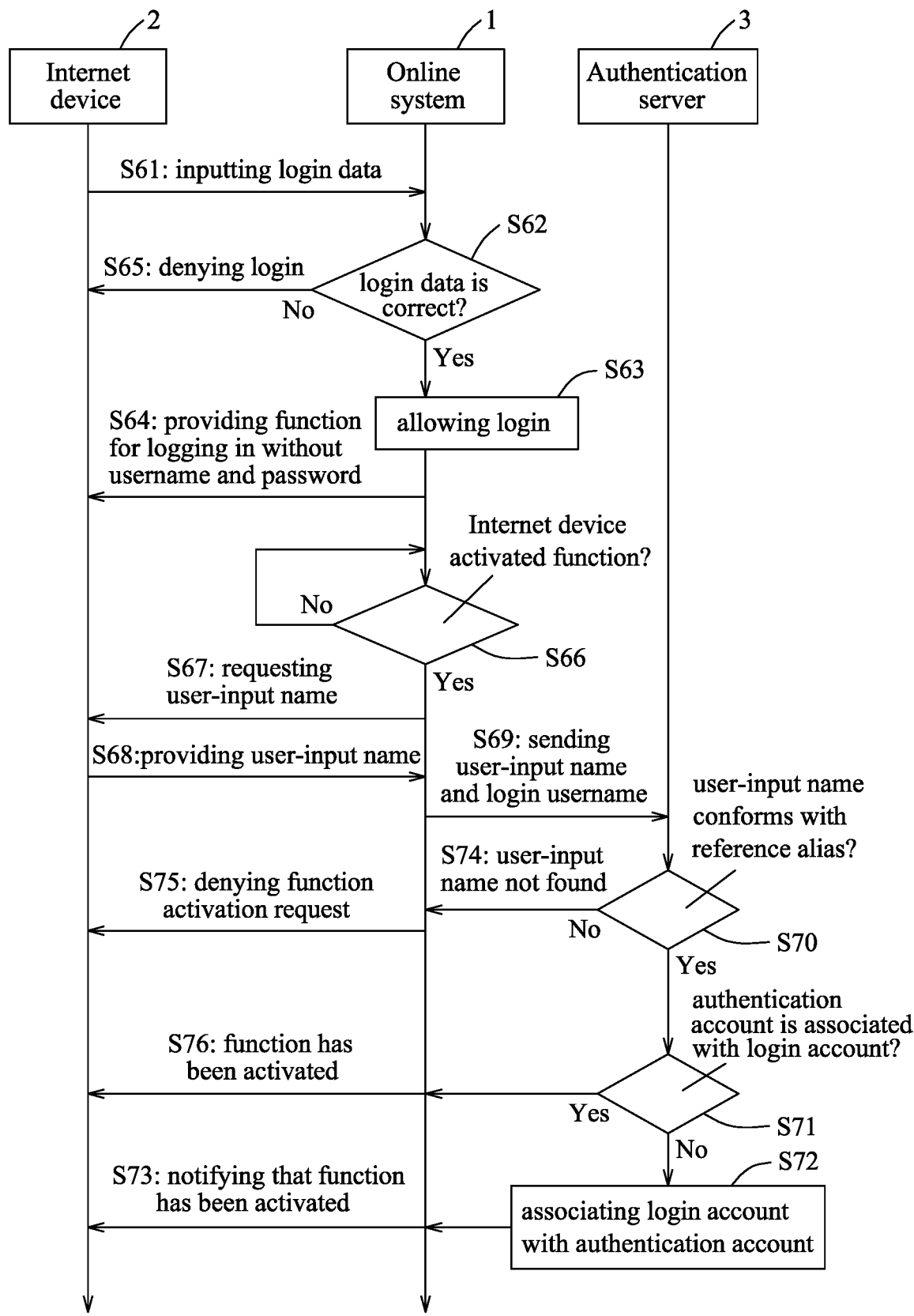
FIG. 6 is a flow chart illustrating steps for registering an authentication account that is associated with a login account on an authentication server according to an embodiment of the disclosure.

Referring to FIG. 6, if the user has already registered the login account and the authentication account respectively on the online system 1 and the authentication server 3, a third registration procedure will be implemented for associating the authentication account with the login account, and includes steps S61-S76.

First, the user needs to log in to the online system 1 with the login account (e.g., by directly connecting to a website of the online system 1 or opening an application provided by the online system 1) using the Internet device 2 to continue with the third procedure for associating the authentication account with the login account.

In step S61, the user inputs login data on the login page of the online system 1 that is opened on the Internet device 2, where the login data includes the login username and a login password that are related to the login account.

In step S62, the online system 1 determines whether the login data is correct. If affirmative, the flow proceeds to step S63; otherwise, the flow proceeds to step S65. The login data is determined to be correct if the online system 1 determines that the login username has been registered on the online system 1, and that the login password matches the login username based on data stored in the online system 1.

In step S63, the online system 1 allows the Internet device 2 to log in to the online system 1 with the login account, and in step S64, the online system 1 provides a function to the Internet device 2 for logging in the online system 1 without inputting a username and a password.

In step S65, the online system 1 denies login of the Internet device 2.

In step S66, the online system 1 determines whether the Internet device 2 has activated the function for logging in the online system 1 without inputting a username and a password. In this embodiment, the function is activated by the user sending a function activation request to the online system 1 through the Internet device 2 (e.g., clicking an activation icon on the login page of the online system 1), and the online system 1 determines that the Internet device 2 chooses to activate the function when in receipt of the function activation request. If the determination made in step S66 is affirmative, the flow proceeds to step S67; otherwise, step S66 is repeated.

In step S67, the online system 1 requests a third user-input name from the Internet device 2, in step S68, the Internet device 2 provides the third user-input name to the online system 1, and in step S69, the online system 1 sends the third user-input name and the login username to the authentication server 3.

In step S70, the authentication server 3 determines whether the third user-input name received from the online system 1 conforms with one of the reference aliases that is stored in the authentication server 3.

When the authentication server 3 determines that the third user-input name conforms with one of the reference aliases, the authentication server 3 finds the authentication account that is associated with the one of the reference aliases, and the flow proceeds to step S71; otherwise, the flow proceeds to step S74.

In step S71, the authentication server 3 determines whether the authentication account is associated with the login account. If negative, the flow proceeds to step S72; otherwise, the flow proceeds to step S76.

In step S72, the authentication server 3 associates the login account with the authentication account (i.e., records the login username in the authentication account data), and in step S73, the authentication server 3 notifies the Internet device 2 through the online system 1 that the function for logging in the online system 1 without inputting a username and a password has been activated.

In step S74, when the authentication server 3 determines that the third user-input name does not conform with any of the reference aliases in step S70, the authentication server 3 notifies the online system 1 that the third user-input name is not found, and in step S75, the online system 1 denies the function activation request made by the Internet device 2.

When the authentication server 3 determines that the authentication account is associated with the login account in step S71, the authentication server 3, in step S76, notifies the Internet device 2 through the online system 1 that the function for logging in the online system 1 without inputting a username and a password has already been activated.

As such, the authentication account that is registered on the authentication server 3 may be associated with the login username of the login account that has already been registered on the online system 1. After the authentication account is associated with the login username, the user may log in to the online system 1 through the Internet device 2 using the flow of method as shown in FIG. 1.

In some embodiments, the at least one alias of the user may be allowed to be identical to another alias that is used by another account registered on the authentication server 3. To correctly find the authentication account, additional steps are performed before step S70 to find the authentication account based on the authentication device 4 (instead of finding the authentication account based on the at least one alias as shown in FIG. 6).

In the case where the user has already registered the login account on the online system 1, but has not yet registered the authentication account on the authentication server 3, a procedure (i.e., the first registration procedure and the third registration procedure) will be implemented for registering the authentication account on the authentication server 3 and then associating the same with the login account.

Figure 7:
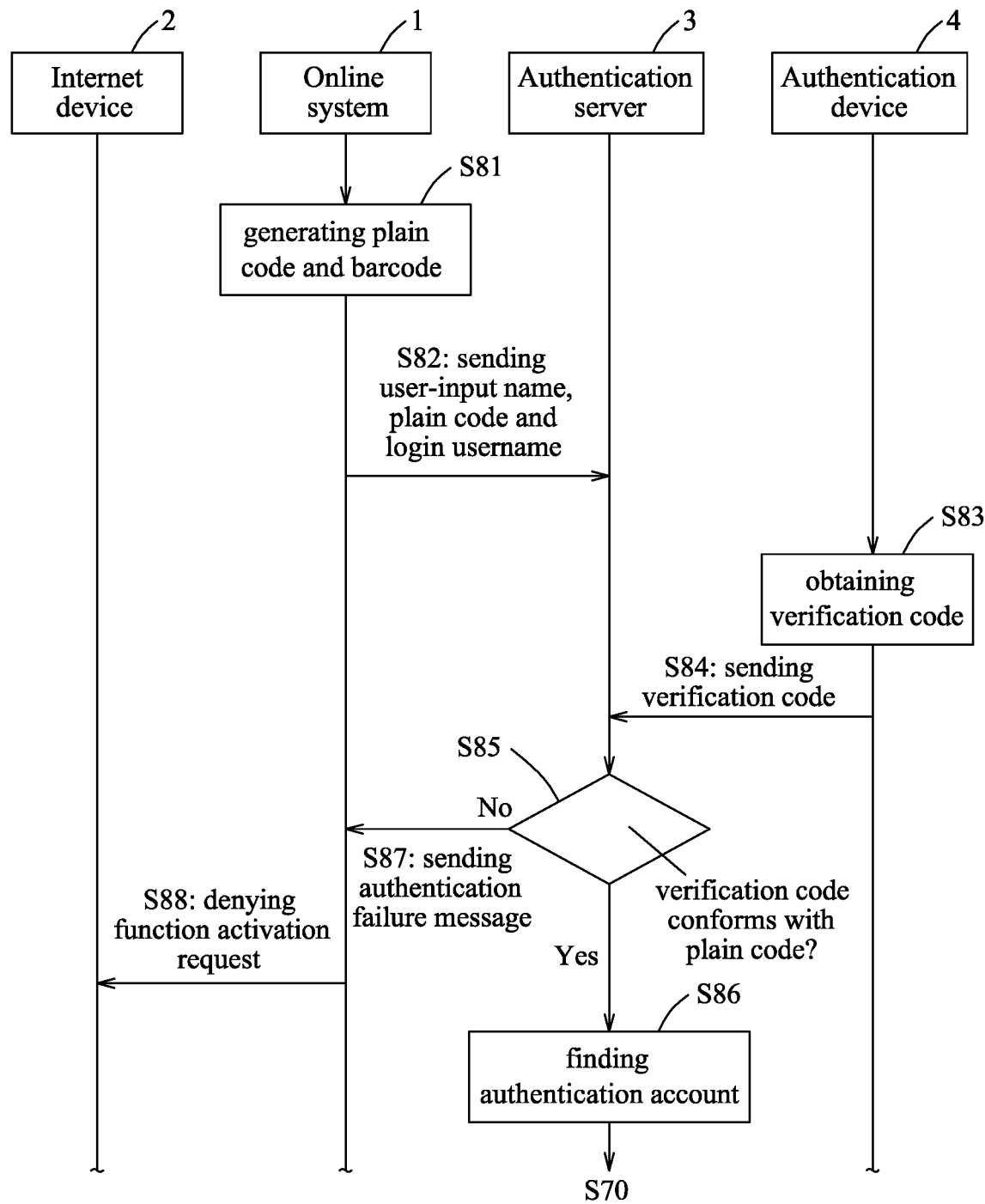
FIG. 7 is a flow chart illustrating steps for finding an authentication account that is bound to an authentication device according to an embodiment of the disclosure.

Further referring to FIG. 7, a third procedure for correctly finding the authentication account includes steps S81-S88 and is implemented between step S66 and step S70, with step S69 being omitted. In this embodiment, step S69 is replaced by the third procedure for correctly finding the authentication account.

In step S81, the online system 1 generates a third plain code and a third barcode that contains the third plain code after the online system 1 determines that the Internet device 2 has activated the function.

In step S82, the online system 1 sends the third user-input name obtained in step S68, the third plain code generated in step S81, and the login username inputted in step 61 to the authentication server 3.

In steps S83-S87, the authentication device 4, the authentication server 3, and the online system 1 perform similar actions as in steps S21-S25, respectively, but with the first plain code and the first barcode in steps S21-S25 being replaced with the third plain code and the third barcode in steps S83-S87.

In step S88, the online system 1 denies the function activation request made by the Internet device 2.

In circumstances where the alias is allowed to be identical to another alias, the flow proceeds to step S70 after step S86, and in step S70, the authentication server 3 determines whether the third user-input name received from the online system 1 conforms with the at least one alias that is associated with the authentication account thus found in step S86. If affirmative, the flow proceeds to step S71; otherwise, the flow proceeds to step S74.

In addition, the authentication account may be modified by the user through a modification procedure. During the modification procedure, the authentication server 3 first performs the verification process to verify the authentication device 4 when the authentication device 4 connects to the authentication server 3, and after confirming that the authentication device 4 has passed the verification process, the authentication server 3 allows the authentication device 4 to manage the at least one alias and the user data that are associated with the authentication account. To be more specific, the authentication device 4 may manage the at least one alias by changing, adding, or deleting one or more of the at least one alias that is associated with the authentication account.

In summary, the authentication server 3 stores the authentication account data related to the authentication account, the at least one alias associated with the authentication account, the login username of the login account that is registered on the online system 1 and that is associated with the authentication account, and information of the authentication device 4 that is bound to the authentication account. When the user intends to log in to the online system 1 through the Internet device 2, the user may only need to provide an alias to the online system 1. After the authentication server 3 confirms that the alias conforms with one of the reference aliases, the authentication server 3 finds the authentication account that is associated with the one of the reference aliases, finds the authentication device 4 that is bound to the authentication account thus found, and sends the query to the user through the authentication device 4 for asking whether to log in to the online system 1. After receiving the confirmation message from the authentication device 4, the authentication server 3 provides the login username to the online system 1, and the online system 1 allows the Internet device 2 to log in using the login username. By using the method provided in the disclosure, the user may successfully log in to the online system 1 using any one of the at least one alias, without inputting the login username and the login password, which may also prevent the login username and the login password that may contain personal information from being hacked by a hacker when performing a password reset process if the user ever forgets the login password.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for logging in an online system through an authentication server, the authentication server storing authentication account data related to an authentication account that is registered on the authentication server, an alias associated with the authentication account, a login username of a login account, and information of an authentication device that is bound to the authentication account, wherein the login account is registered on the online system and is associated with the authentication account, the authentication server being coupled to the online system, the method comprising steps of:

the online system sending a first user-input name to the authentication server, where the first user-input name was inputted on a login page of the online system opened on an Internet device;

the authentication server finding the authentication account;

the authentication server determining whether the first user-input name received from the online system conforms with the alias that is stored in the authentication server;

when the authentication server determines that the first user-input name conforms with the alias, the authentication server sending a query message to the authentication device that is bound to the authentication account thus found, where the query message is related to asking whether to log in to the online system;

when the authentication server receives a confirmation message from the authentication device in response to the query message, the authentication server providing the login username of the login account that is associated with the authentication account to the online system;

the online system determining whether the login username provided by the authentication server has been registered on the online system; and when the online system determines that the login username has been registered on the online system, the online system allowing the Internet device to log in to the online system using the login account.

2. The method as claimed in claim 1, further comprising steps of:

the authentication server performing a verification process to verify the authentication device using an authenticator that is installed on the authentication device when the authentication device connects to the authentication server; and the authentication server implementing the step of sending the query message to the authentication device after confirming that the authentication device has passed the verification process.

3. The method as claimed in claim 1, wherein the step of finding the authentication account is implemented when the authentication server determines that the first user-input name conforms with the alias, and is to find the authentication account that is associated with the alias.

4. The method as claimed in claim 1, further comprising steps of:

the online system generating a plain code and a barcode that contains the plain code when the Internet device accesses the login page of the online system; and the online system sending the plain code together with the first user-input name to the authentication server, wherein the step of finding the authentication account is implemented before the step of determining whether the first user-input name conforms with the alias, and includes:

the authentication server determining whether a verification code received from the authentication device conforms with the plain code received from the online system, where the verification code is obtained by the authentication device through one of scanning the barcode and reading a manual input of the plain code; and when the authentication server determines that the verification code conforms with the plain code, the authentication server finding the authentication account that is bound to the authentication device.

5. The method as claimed in claim 1, further comprising a first registration procedure for registering the authentication account on the authentication server, the first registration procedure including steps of:

the authentication device connecting to the authentication server;

the authentication device allowing a user to register the authentication account on the authentication server when the authentication device is connected to the authentication server; and the authentication device allowing the user to set the alias and user data that are associated with the authentication account, where the user data includes contact information to be used for communicating with the authentication device, the method further comprising a modification procedure for modifying the authentication account, the modification procedure including steps of:

the authentication server performing a verification process to verify the authentication device when the authentication device connects to the authentication server, and the authentication server allowing the user to use the authentication device to manage the alias and the user data that are stored on the authentication server after confirming that the authentication device has passed the verification process.

6. The method as claimed in claim 5, further comprising a second registration procedure for registering the login account that is associated with the authentication account on the online system, the second registration procedure including steps of:

the online system sending a second user-input name and an information request to the authentication server, where the second user-input name was inputted on a registration page of the online system opened on the Internet device, and the information request is related to asking for user information required for registering the login account on the online system;

the authentication server determining whether the second user-input name received from the online system conforms with the alias that is stored in the authentication server;

when the authentication server determines that the second user-input name conforms with the alias, the authentication server finding the authentication account that is associated with the alias, finding the authentication device that is bound to the authentication account based on the user data that is associated with the authentication account, and sending a registration message to the authentication device, where the registration message is related to asking whether to register an account on the online system;

when the authentication server receives a registration confirmation message from the authentication device in response to the registration message, the authentication server providing registration data to the authentication device, where the registration data includes the login username, and the user information that the information request asked for and that is obtained from the user data which is associated with the authentication account; and the authentication server sending confirmed data received from the authentication device to the online system for registering the login account on the online system, where the confirmed data is the registration data that is confirmed by the user using the authentication device.

7. The method as claimed in claim 1, further comprising a registration procedure for registering the authentication account to be associated with the login account on the authentication server, the registration procedure including steps of:

the authentication device connecting to the authentication server;

the authentication device allowing a user to register the authentication account on the authentication server when the authentication device is connected to the authentication server;

the authentication device allowing the user to set the alias and user data that are associated with the authentication account, where the user data includes contact information to be used for communicating with the authentication device;

the online system determining whether login data received from the Internet device is correct, where the login data was inputted on the login page of the online system opened on the Internet device and includes the login username and a login password that are related to the login account;

when the online system determines that the login data is correct, the online system allowing the Internet device to log in to the online system with the login account;

the online system requesting a second user-input name from the Internet device, and sending the second user-input name and the login username to the authentication server;

the authentication server determining whether the second user-input name received from the online system conforms with the alias that is stored in the authentication server;

when the authentication server determines that the second user-input name conforms with the alias, the authentication server finding the authentication account that is associated with the alias, and determining whether the authentication account is associated with the login account; and when the authentication server determines that the authentication account is not associated with the login account, the authentication server associating the login account with the authentication account.

8. The method as claimed in claim 1, further comprising a registration procedure for registering the authentication account to be associated with the login account on the authentication server, the registration procedure including steps of:

the authentication device connecting to the authentication server;

the authentication device allowing a user to register the authentication account on the authentication server when the authentication device is connected to the authentication server;

the authentication device allowing the user to set the alias and user data that are associated with the authentication account, where the user data includes contact information to be used for communicating with the authentication device;

the online system determining whether login data received from the Internet device is correct, where the login data was inputted on the login page of the online system opened on the Internet device and includes the login username and a login password that are related to the login account;

when the online system determines that the login data is correct, the online system allowing the Internet device to log in to the online system with the login account;

the online system requesting a second user-input name from the Internet device, generating a plain code and a barcode that contains the plain code after the online system receives the second user-input name from the Internet device, and sending the plain code, the second user-input name, and the login username to the authentication server;

the authentication server determining whether a verification code received from the authentication device conforms with the plain code received from the online system, where the verification code is obtained by the authentication device through one of scanning the barcode and reading a manual input of the plain code;

when the authentication server determines that the verification code conforms with the plain code, the authentication server finding the authentication account that is bound to the authentication device;

the authentication server determining whether the second user-input name received from the online system conforms with the alias that is stored in the authentication server;

when the authentication server determines that the second user-input name conforms with the alias, the authentication server determining whether the authentication account is associated with the login account; and when the authentication server determines that the authentication account is not associated with the login account, the authentication server associating the login account with the authentication account.

9. The method as claimed in claim 1, wherein the online system communicates with the Internet device through a first channel, the online system communicates with the authentication server through a second channel, and the authentication server communicates with the authentication device through a third channel;

the first channel, the second channel, and the third channel are independent of and separated from each other; and data transmitted through the second channel and the third channel are encrypted.

10. The method as claimed in claim 1, further comprising a modification procedure for modifying the authentication account, the modification procedure including steps of:

the authentication server performing a verification process to verify the authentication device when the authentication device connects to the authentication server, and the authentication server allowing a user to use the authentication device to manage the alias and user data that are stored on the authentication server after confirming that the authentication device has passed the verification process, where the user data is associated with the authentication account and includes contact information to be used for communicating with the authentication device.

11. An authentication system configured to allow an Internet device to log in to an online system without a username and a password, said authentication system comprising:

an authentication server configured to be coupled to and communicate with the online system, and store an authentication account data related to an authentication account that is registered on said authentication server, an alias that is associated with the authentication account, and a login username of a login account, wherein the login account is registered on the online system and is associated with the authentication account; and an authentication device configured to communicate with said authentication server and bound to the authentication account, said authentication server further storing information of said authentication device, wherein said authentication server is further configured to find the authentication account, determine whether a first user-input name received from said online system conforms with the alias that is stored in said authentication server, where the first user-input name was inputted on a login page of the online system opened on the Internet device, when said authentication server determines that the first user-input name conforms with the alias, send a query message to said authentication device that is bound to the authentication account thus found, where the query message is related to asking whether to log in to said online system, and when said authentication server receives a confirmation message from said authentication device in response to the query message, provide the login username of the login account that is associated with the authentication account to the online system in order for the online system to determine whether the login username provided by said authentication server has been registered on the online system, and to allow the Internet device to log in to the online system with the login account when the online system determines that the login username has been registered on the online system.

12. The authentication system as claimed in claim 11, wherein said authentication device is configured to be integrated with the Internet device as one device.

13. The authentication system as claimed in claim 11, wherein said authentication server is further configured to:
when said authentication device connects to said authentication server, perform a verification process to verify said authentication device using an authenticator that is installed on said authentication device; and
send the query message to said authentication device after confirming that said authentication device has passed the verification process.

14. The authentication system as claimed in claim 11, wherein said authentication server is configured to find the authentication account by finding the authentication account that is associated with the alias when said authentication server determines that the first user-input name conforms with the alias.

15. The authentication system as claimed in claim 11, the online system generating a plain code and a barcode that contains the plain code when the Internet device accesses the login page of the online system, the online system sending the plain code together with the first user-input name to said authentication server,
wherein said authentication device is configured to obtain a verification code through one of scanning the barcode and reading a manual input of the plain code,
wherein said authentication server is configured to find the authentication account by steps of
determining whether the verification code received from said authentication device conforms with the plain code received from said online system, and
when said authentication server determines that the verification code conforms with the plain code, finding the authentication account that is bound to said authentication device.

16. The authentication system as claimed in claim 11, wherein said authentication device is configured to perform a first registration procedure to register the authentication account on said authentication server by:
connecting to said authentication server;
allowing a user to register the authentication account on said authentication server when said authentication device is connected to said authentication server; and
allowing the user to set the alias and user data that are associated with the authentication account, where the user data includes contact information to be used for communicating with said authentication device,
wherein said authentication server is configured to perform a modification procedure to modify the authentication account by
performing a verification process to verify said authentication device when said authentication device connects to said authentication server, and
allowing the user to use the authentication device to manage the alias and the user data that are stored on said authentication server after confirming that said authentication device has passed the verification process.

17. The authentication system as claimed in claim 16, wherein said authentication server is further configured to perform a second registration procedure to register the login account that is associated with the authentication account on said online system by:
determining whether a second user-input name received from said online system conforms with the alias that is stored in said authentication server, where the second user-input name was inputted on a registration page of the online system opened on the Internet device and was sent to said authentication server by the online system;
when said authentication server determines that the second user-input name conforms with the alias, finding the authentication account that is associated with the alias, finding said authentication device that is bound to the authentication account based on the user data that is associated with the authentication account, and sending a registration message to said authentication device, where the registration message is related to asking whether to register an account on said online system;
when said authentication server receives a registration confirmation message from said authentication device in response to a registration message that is received from said online system and that is related to asking for user information required for registering the login account on said online system, providing registration data to said authentication device, where the registration data includes the login username, and the user information that the information request asks for and that is obtained from the user data which is associated with the authentication account; and
sending confirmed data received from said authentication device to said online system for registering the login account on said online system, where the confirmed data is the registration data that is confirmed by the user using said authentication device.

18. The authentication system as claimed in claim 11, wherein said authentication server and said authentication device are further configured to cooperatively perform a registration procedure to register, on said authentication server, the authentication account to be associated with the login account by:
- said authentication device connecting to said authentication server;
- said authentication device allowing a user to register the authentication account on said authentication server when said authentication device is connected to said authentication server;
- said authentication device allowing the user to set the alias and user data that are associated with the authentication account, where the user data includes contact information to be used for communicating with said authentication device;
- said authentication server determining whether a second user-input name received from said online system conforms with the alias that is stored in said authentication server, where the second user-input name was received from the Internet device upon being requested by the online system;
- when said authentication server determines that the second user-input name conforms with the alias, said authentication server finding the authentication account that is associated with the alias, and determining whether the authentication account is associated with the login account received from said online system; and
- when said authentication server determines that the authentication account is not associated with the login account, said authentication server associating the login account with the authentication account.

19. The authentication system as claimed in claim 11, the online system requesting a second user-input name from the Internet device, generating a plain code and a barcode that contains the plain code after the online system receives the second user-input name from the Internet device, and sending the plain code, the second user-input name, and the login username to the authentication server, wherein said authentication server and said authentication device are configured to cooperatively perform a registration procedure to register, on said authentication server, the authentication account to be associated with the login account by:
- said authentication device obtaining a verification code through one of scanning the barcode and reading a manual input of the plain code;
- said authentication device connecting to said authentication server;
- said authentication device allowing a user to register the authentication account on said authentication server when said authentication device is connected to said authentication server;
- said authentication device allowing the user to set the alias and user data that are associated with the authentication account, where the user data includes contact information to be used for communicating with said authentication device;
- said authentication server determining whether the verification code received from said authentication device conforms with the plain code received from said online system;
- when said authentication server determines that the verification code conforms with the plain code, said authentication server finding the authentication account that is bound to said authentication device;
- said authentication server determining whether the second user-input name received from said online system conforms with the alias that is stored in said authentication server;
- when said authentication server determines that the second user-input name conforms with the alias, said authentication server determining whether the authentication account is associated with the login account received from said online system; and
- when said authentication server determines that the authentication account is not associated with the login account, said authentication server associating the login account with the authentication account.

20. The authentication system as claimed in claim 11, the online system communicating with the Internet device through a first channel, wherein:
- said authentication server is configured to communicate with the online system through a second channel, and said authentication server is configured to communicate with said authentication device through a third channel;
- the first channel, the second channel, and the third channel are independent of and separated from each other; and
- data transmitted through the second channel and the third channel are encrypted.

21. The authentication system as claimed in claim 11, wherein said authentication server is configured to perform a modification procedure to modify the authentication account by:
- performing a verification process to verify said authentication device when said authentication device connects to said authentication server; and
- allowing a user to use said authentication device to manage the alias and user data that are stored on said authentication server after confirming that said authentication device has passed the verification process, where the user data is associated with the authentication account and includes contact information to be used for communicating with the authentication device.

* * * * *